May 17, 1932. W. BESONSON 1,858,700
POWER TAKE-OFF
Filed March 30, 1931  2 Sheets-Sheet 1
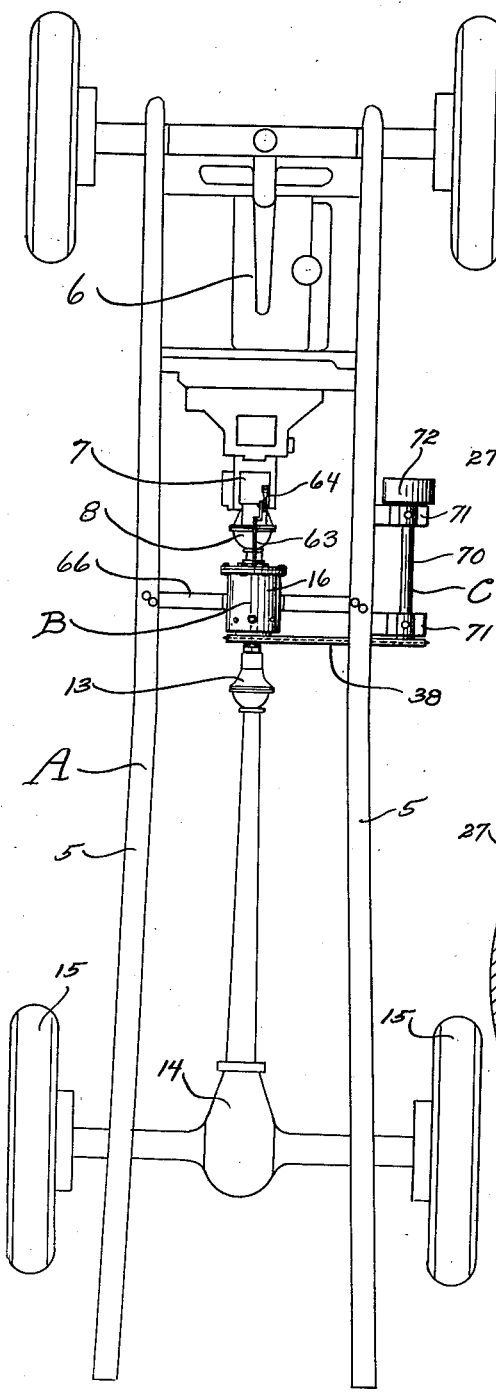
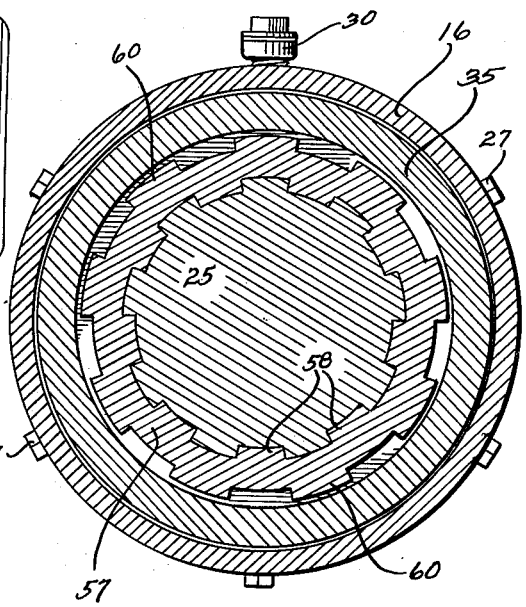
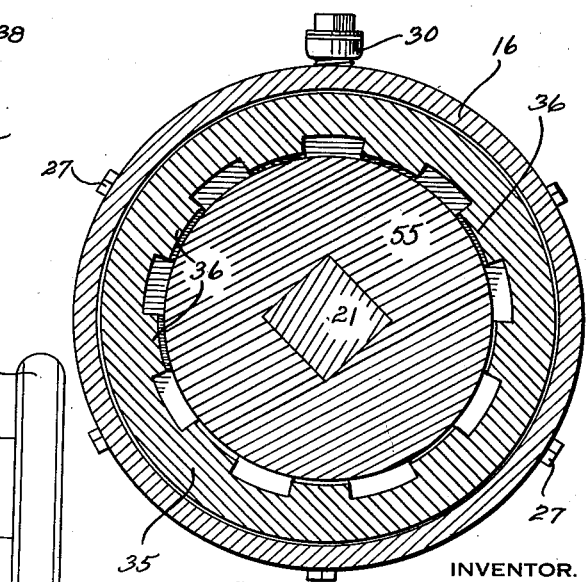
INVENTOR.
Walter Besonson
BY Lancaster, Allwine and Rommel
ATTORNEYS.

May 17, 1932. W. BESONSON 1,858,700
POWER TAKE-OFF
Filed March 30, 1931    2 Sheets-Sheet 2

INVENTOR.
Walter Besonson
BY Lancaster, Allwine and Rommel
ATTORNEYS.

Patented May 17, 1932

1,858,700

UNITED STATES PATENT OFFICE

WALTER BESONSON, OF RAYMOND, WASHINGTON

POWER TAKE-OFF

Application filed March 30, 1931. Serial No. 526,478.

The present invention relates to power take-off devices and the primary object of the invention is to provide an improved power take-off unit primarily intended for use upon motor vehicles whereby the motive power for propelling the vehicle may be utilized for operating other machinery either mounted or separate from the vehicle.

A further object of the invention is to provide selective motion transmitting means whereby independent pieces of machinery or other apparatus may be so connected as to be separately operated or selectively coupled for operation one with the other.

A further object resides in the novel arrangement whereby two separate pieces of apparatus may either be selectively operated, or operated in unison from a single drive shaft.

A further object of the invention is to provide a power take-off unit for motor vehicles whereby auxiliary machines mounted on the vehicle may be operated from the vehicle engine, either while the vehicle is in motion or when not in motion.

A still further object of the invention is to provide a device of this character which is of extremely compact construction and which may be interposed in the drive between the transmission and differential of a motor vehicle whereby power from the vehicle engine may be utilized for purposes other than that of propelling the vehicle.

A still further object of the invention is to provide a device of this character whereby two separate pieces of machinery may be synchronously driven from a single drive shaft, or in a reverse condition, two prime movers may be connected for delivering power to a single power shaft.

Other objects and advantages of the invention will be apparent during the course of the following detailed description, taken in connection with the accompanying drawings forming a part of this specification and in which drawings:—

Figure 1 is a top plan view of a motor vehicle chassis and showing the power take-off device interposed in the drive between the transmission and differential.

Figures 4 and 5 are transverse sections on the respective lines in Figure 2.

Figure 2:
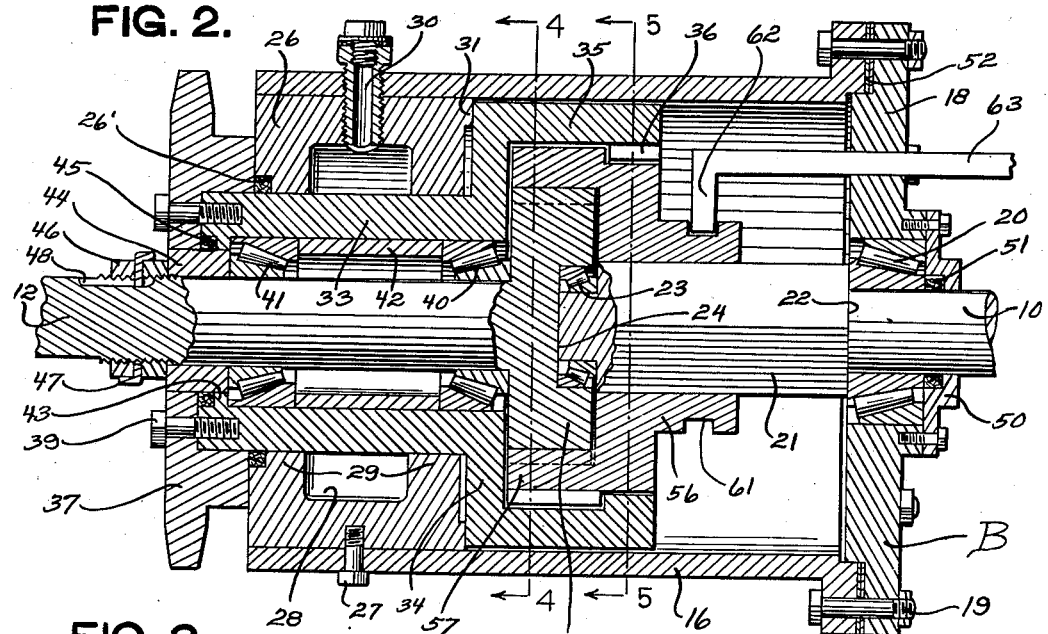
Figure 2 is a central longitudinal section thru the unit with the parts shown in a position for providing a drive between the transmission and propeller shafts.

Referring to the drawings in detail, and wherein similar reference characters designate corresponding parts thruout the several views, the letter A designates a motor vehicle chassis having associated therewith the improved take-off means embodying a power take-off unit B and power delivering or transferring means C.

The chassis A includes the usual frame embodying the side rails 5 between the forward ends of which is mounted the engine 6 at the rear of which is provided the usual transmission 7 having the usual main shaft "not shown" connected by a universal joint 8 to the forward end of a front or drive shaft 10 of the take-off unit B. The rear or driven shaft 12 of the take-off unit is connected by a universal joint 13 to the propeller shaft which transmits power thru the differential 14 to the driving wheels 15. In usual motor vehicle construction, the propeller shaft is connected to the universal 8 thru the drive shaft of the transmission and it will be observed from Figure 1 that the improved power take-off unit is interposed in the drive between the transmission and differential.

Referring now to the construction and operation of the unit B, the same is preferably constructed with a tubular casing 16 being open at each end and provided at its forward end with an integral outturned flange 17. Closing the forward end of the casing 16 is a front end cover plate 18 adapted to be secured in position by means of bolts 19 extended thru the casing flange 17. Mounted axially of the cover plate 18 is a tapered roller bearing 20 for mounting of the drive shaft 10. The drive shaft 10 is provided with a squared portion 21 forming a shoulder 22 abutting with the inner race of the roller bearing 20. The squared portion 21 extends for about one-half the length of the casing 16 and has its rear portion reduced and mounted in a tapered roller bearing 23 mounted in a pocket 24 provided in the front face of a gear spur 25 provided at the forward end of the rear or driven shaft 12. It may here be well to note that the reduced rear end of the drive shaft 10 abuts with the flat bottom of the pocket 24 and this is to prevent forward end thrust of the rear shaft 12.

Mounted in the rear portion of the casing 16 is a combined thrust and centering ring bearing 26 which is preferably secured against rotation by a suitable number of stud bolts 27. The ring 26 is provided with an internal annular channel 28 providing spaced bearing portions 29. The channel 28 provides an oil pocket, and an oil tube 30 closed by a suitable plug, may be threaded thru the upper portion of the casing and the ring 26 to permit filling of the oil pocket with a suitable lubricant. The oil tube 30 also co-acts with the stud bolts 27 to prevent movement of the ring bearing 26. The ring 26 is also provided at its forward face with an annular bearing flange 31.

Rotatably mounted in the ring bearing 26 is a power take-off gear member 32 embodying a sleeve portion 33 rotatable in the bearing portions 29 and provided at its forward end with a flange 34 the rear face of which abuts with the bearing flange 31. Projecting forwardly from the flange 34 is a ring portion 35 provided adjacent its forward end with internal teeth 36 providing an internal ring gear portion at the forward end of the gear member 32. The internal ring gear formed by the teeth 36 is of greater diameter than the diameter of the gear 25 providing an annular space between the circumference of the gear 25 and inner circumference of the ring portion 35. As will be observed in Figure 2, the rear ends of the teeth 36 are spaced slightly forward of the front face of the gear 25. The rear portion of the sleeve 33 preferably projects beyond the rear face of the ring bearing 26 and has coupled thereto a drive coupling member 37 which in the example shown is a sprocket wheel for receiving a sprocket chain 38. The sprocket wheel 37 is connected for rotation with the gear member 32 by means of suitable bolts 39 threaded into the rear end of the sleeve portion 33. The sprocket 37 has bearing engagement with the rear face of the ring bearing 26 and acts to prevent forward sliding movement of the gear member 32 in the ring bearing. Any other form of drive coupling member such as a pulley, gear or the like may be bolted to the power take-off gear member 32 and co-act with the flange 34 of the gear member for preventing longitudinal movement of the gear member in the ring bearing 26. An annular groove is preferably formed in the rear face of the ring bearing 26 for receiving a felt oil ring 26'.

Arranged in the sleeve portion 33 is a pair of front and rear tapered roller bearings 40 and 41 respectively, held in spaced relation by a spacing ring or sleeve 42 arranged between the outer bearing races of the bearings. These roller bearings 40 and 41 serve to support the shaft 12 axially of the sleeve portion 33 and in axial alignment with the drive shaft 10. The inner race of the front bearing 40 abuts with the rear face of the gear 25 and the outer race of the rear bearing 41 has its rear edge abutting with an internal thrust flange 43 provided adjacent the rear end of the sleeve 33. This thrust flange 43 has an internal diameter such as to prevent contact of the flange with the inner race of the rear bearing 41. Encircling the shaft 12 is a thrust ring 44 having its forward end engaging the inner race of the rear roller bearing 41. This ring 44 extends thru the sprocket 37 and also into the thrust flange 43. The flange 43 and sprocket 37 provide an annular groove about the ring 44 for receiving a suitable oil retaining ring 45 such as felt or the like. Threaded on the rear shaft 12 at the rear of the ring 44 is a pair of adjusting nuts 46 between which is arranged a suitable lock washer 47 which may have an inner projection for fitting in a keyway 48 provided in the shaft.

Bolted to the front end cover 18 about the front shaft 10 is a bearing cover 50 with which the outer bearing race of the roller bearing 20 abuts, and this bearing cover may be so shaped to receive a felt oil ring 51 about the shaft 10. Adjustment of the nut 46 will take up any wear in the roller bearings 40 and 41, and forward end thrust of the shaft 12 is prevented by its abutting engagement with the rear end of the front shaft 10. Forward end thrust of the front shaft 10 is prevented by the bearing cover 50. Adjustment of the front roller bearing 20 is accomplished by means of shims 52 arranged between the casing flange 17 and end cover 18. By providing for adjustment at each end of the casing, the shafts 10 and 12 may be adjusted longitudinally within the casing for preventing contact of the rear face of the gear 25 with the front surface of the thrust flange 34.

Slidable on the squared portion 21 of the front shaft 10 is a clutch member 55 embodying a sleeve portion 56 having a square opening therethru receiving the squared shaft portion 21. Formed at the rear end of the sleeve portion 56 is a double ring gear 57 provided with internal teeth 58 for meshing with the teeth of the gear 25 and external teeth 60 for meshing with the teeth 36 formed internally at the forward end of the gear member 32. The forward portion of the sleeve 56 is provided with an annular groove 61 for receiving a shifting fork 62 carried by an operating rod 63 slidably extended thru the end cover 18. The operating rod 63 is connected to a suitable operating lever 64 which may be mounted upon the transmission casing 7 or in any other convenient location to the operator. The operating lever 64 may be provided with a suitable pawl adapted for locking the lever in any one of three positions for selective operation of the power take-off unit.

Figure 3:
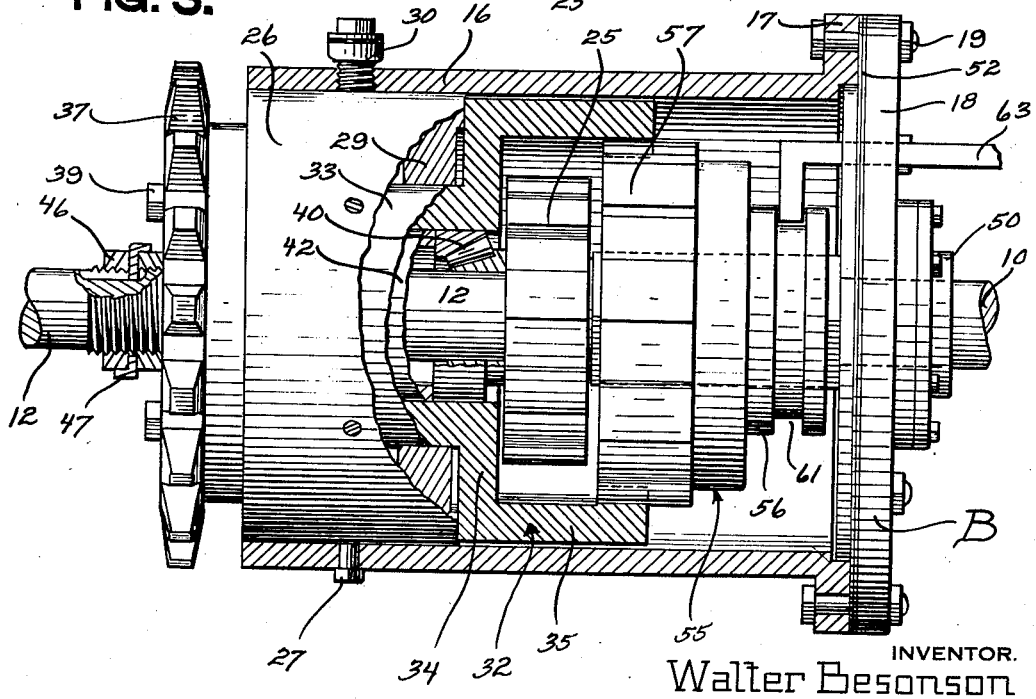
Figure 3 is a view part in longitudinal section and part in side elevation and showing the parts in position for breaking the drive coupling between the transmission and propeller shaft and transmitting power to the take-off sprocket.

In operation, when the operating rod 63 is locked in its rearmost position, the internal teeth of the ring gear 57 are meshing with the gear 25 and out of mesh with the teeth 36 of the gear member 32. With the clutch member 65 in this position as shown in Figure 2, power delivered to the drive shaft 10 will transmit rotation to the rear shaft 12 for imparting travel to the vehicle without causing rotation of the sprocket 37. By moving the clutch member 55 forwardly to the the intermediate position of the operating lever 64, the internal teeth 58 of the ring gear 57 are still engaged for a portion of their length with the gear 25 sufficient to transmit power to the shaft 12 for propelling the vehicle. In this intermediate position of the clutch member, the external teeth 60 of the ring gear 57 are in mesh at their forward portions with the teeth 36 of the gear member 32 so that in the intermediate position of the clutch member power from the shaft 10 is delivered to both the shaft 12 and power take-off gear member 32. When the clutch member 55 is moved to its foremost position, the internal teeth of the ring gear 57 are out of mesh with the gear 25 and the external teeth 60 of the ring gear are in mesh with the teeth 36. This third position of the clutch member is shown in Figure 3 of the drawings and from which it will be seen that power from the drive shaft 10 is transmitted only to the power take-off gear member 32 and no power is delivered to the rear shaft 12 for propelling the vehicle. Thus it will be seen that thru adjustment of the gear clutch member 55 the shaft 12 may be rotated independently of the take-off gear member 32; the shaft 12 coupled for rotation with the take-off gear member 32, or the take-off gear member 32 operated independently of the shaft 12. With this arrangement it will be seen that two separate pieces of apparatus connected one with the shaft 12 and the other with the sprocket 37 may either be independently operated, or operated in unison from a single drive shaft.

The unit B may be mounted on the vehicle between the side rails 5 by means of one or more suitable cross members 66 to which the casing 16 may be secured so that the unit is in proper alignment between the transmission 7 and differential 14. In instances where the power take-off unit is incorporated as standard or special equipment, the casing 16 may be attached directly to the transmission casing of the vehicle or if so desired, the transmission casing may be extended to include the power take-off mechanism.

While any form of power transferring means C may be connected for operation by the power take-off gear member 32, in the example shown the shaft 70 is journaled in suitable bearings 71 secured to one of the frame rails 5. The shaft 70 may be provided with a suitable sprocket over which the chain 38 is trained and may be provided with a pulley 72 for receiving a belt adapted to run a piece of machinery which may either be mounted upon the vehicle or separate from the vehicle. The power transferring means C has merely been shown as one means of receiving power from the take-off unit B and it is to be understood that the power transferring means C may be varied according to the type of machine or other apparatus to be driven. As before mentioned, a gear, pulley or any other form of coupling member may be substituted for the sprocket 37.

The power take-off unit is capable of use in connection with other apparatus and its use is not restricted as a power take-off means for use upon a motor vehicle as shown.

From the foregoing it will be apparent that a novel and improved device of this character has been provided whereby separate pieces of machinery may either be selectively operated, or operated in unison from a single drive shaft. The arrangement disclosed also permits of two separate power plants to be selectively or jointly coupled for driving the shaft 10 when the device is connected for operation in a reverse condition from that herein described. It will also be apparent that the construction of the device permits of a compact unit being provided and also permits ready take-up of any wear.

Changes in detail may be made to the form of invention herein shown and described, without departing from the spirit of the invention or the scope of the following claims.

I claim:

1. In a power take-off unit, a casing, front and rear shafts journaled in axial alignment in the casing, said rear shaft provided at its forward end with a spur gear, a gear member concentrically rotatable about the rear shaft and having a ring gear at its forward end, a clutch member non-rotatable and axially movable on the front shaft and having a gear portion provided with internal teeth for meshing with said spur gear and external teeth for meshing with said ring gear, and operating means for the clutch member for selectively coupling the gear portion of the clutch member with either the spur gear or the ring gear for independent operation thereof, or to both the spur gear and ring gear for simultaneous operation of both the rear shaft and the gear member.

2. In a power take-off unit, a casing, a rear shaft journaled in the rear portion of the casing and having a spur gear at its forward end, a front shaft journaled in axial alignment with the rear shaft, a power take-off member rotatable in the casing about the rear shaft and having a ring portion at its forward end encircling the spur gear, said ring portion having internal teeth providing a ring gear, and a clutch member slidable and non-rotatable on the front shaft and embodying a double ring gear having internal teeth for slidably meshing with the spur gear and external teeth for slidably meshing with the ring gear, said double ring gear to independently mesh with either the spur gear or the ring gear, or partially mesh with both at an intermediate position of movement of the clutch member.

3. In a power transmission unit, a casing, a ring bearing mounted in the rear portion of the casing, a power take-off member including a sleeve portion rotatable in the ring bearing and having a ring portion at its forward end provided with internal gear teeth, a driven shaft journaled in said sleeve portion and having a spur gear at its forward end, an end cover closing the front end of the casing, a drive shaft journaled in the end cover and having its rear end journaled in said spur gear in axial alignment with said driven shaft, a clutch member slidable and non-rotatable on the drive shaft and having a double ring gear portion provided with internal teeth for slidably meshing with said spur gear and external teeth for slidably meshing with the internal teeth on the ring portion of the power take-off member, and shifting means for the clutch member for selectively and jointly controlling rotation of the driven shaft and power take-off member from the drive shaft.

4. In a power transmission unit the combination of a casing, a ring bearing fixed on the rear portion of the casing, a power take-off member rotatable in the ring bearing and having a ring portion at its forward end provided with an internal ring gear portion, a rear shaft journaled in said member and having a spur gear of less diameter than that of said ring gear and disposed slightly to the rear of the ring gear, a front shaft journaled in axial alignment at the forward end of the rear shaft and having a squared portion, a clutch member including a sleeve portion slidable on the squared shaft portion and a double ring gear slidably movable between the spur gear and said ring gear for meshing therewith, and sliding means for the clutch member whereby the double ring gear may be meshed for independently rotating either the rear shaft or the power take-off member, or meshed for imparting rotation to both.

5. In a power take-off unit the combination of a tubular casing, a ring bearing fixed in the casing at the rear end thereof, a power take-off member including a sleeve portion rotatable in the ring bearing and an enlarged ring portion at the forward end of the sleeve portion provided with internal teeth, a drive coupling member carried by the rear end of the sleeve, axially aligning front and rear shafts, said rear shafts being rotatably journaled in said sleeve and having a spur gear at its forward end arranged within said ring portion, said front shaft having a bearing at its rear end in said spur gear, a clutch member non-rotatably and axially movable on the front shaft and embodying a combined internal and external ring gear for respectively meshing with the spur gear and internal teeth of said ring portion, and operating means for the clutch member for selectively and jointly imparting rotation to the rear shaft and power take-off member from the front shaft.

6. In a power take-off unit the combination of a tubular casing, a cover plate closing the forward end of the casing, a ring bearing fixed in the rear portion of the casing, a power take-off member rotatable in the ring bearing and having an internal ring gear at its forward end, a driven shaft rotatably journaled in the member and provided at its forward end with a spur gear offset rearwardly from said ring gear, a drive shaft journaled extended thru the front cover plate and having a bearing at its rear end in said spur gear, means for preventing longitudinal movement of the shaft, a clutch member slidably and non-rotatably mounted on the drive shaft and embodying a double ring gear having internal teeth for meshing with the spur gear and external teeth for meshing with said ring gear, and operating means for the clutch member whereby the double ring gear may mesh either with the spur gear or with the ring gear or partially mesh with both the spur gear and ring gear simultaneously.

7. In a power take-off unit the combination of a tubular casing, a cover plate connected with the forward end of the casing, a ring bearing secured in the rear end of the casing, a gear member including a sleeve portion rotatable in the ring bearing, a thrust flange at the forward end of the sleeve engageable with the front face of the ring bearing and a ring portion projecting forwardly from the thrust flange and having an internal ring gear provided at its forward end, a drive coupling member secured to the rear end of said sleeve portion in bearing contact with the rear end of the ring bearing, a driven shaft journaled axially in the sleeve portion and provided at its forward end with a spur gear arranged in the ring portion of the gear member rearwardly of the internal ring gear, a drive shaft in axial alignment at the forward end of the driven shaft and having a bearing at its rear end in said spur gear, and a clutch member for selective and jointly controlling rotation of the gear member and driven shaft from the drive shaft comprising a sleeve portion axially movable on the drive shaft and a double ring gear having internal teeth for meshing with said spur gear and external teeth for meshing with said ring gear.

8. In a power take-off unit the combination of a tubular casing, a cover plate for the front end of the casing, a ring bearing secured in the rear end of the casing, a power take-off member rotatable in the ring bearing and held against axial movement thereby, said member having an internal ring gear at its forward end, a driven shaft having a spur gear at its forward end, roller bearings supporting the driven shaft axially in the power take-off member, take-up means for the roller bearings, a drive shaft having a bearing in the front cover plate, a bearing supporting the rear end of the drive shaft in the front face of the spur gear in axial alignment with the driven gear, and a clutch member non-rotatable and axially slidable on the drive shaft and embodying a double ring gear for meshing with said spur gear and the ring gear independently of one another for connecting both for simultaneous operation from the drive shaft.

9. In a power take-off unit the combination of a tubular casing, a cover plate closing the front end of the casing, a ring bearing secured in the rear portion of the casing, a gear member including a sleeve portion rotatable in the ring bearing and having a thrust flange at its forward end engaging the forward face of the ring bearing and a ring portion projecting forwardly from the thrust flange and provided at its forward end with an internal ring gear, said sleeve portion having an internal thrust flange adjacent its rear end, a drive coupling member secured to the rear end of the sleeve portion in bearing contact with the rear face of the ring bearing, front and rear tapered roller bearings in the sleeve portion, a spacing sleeve for the roller bearings, said rear roller bearing having its outer race engageable with said internal thrust flange, a driven shaft supported axially in said sleeve portion by the tapered roller bearings and having a spur gear at its forward end to be engaged by the inner race of the front roller bearing, an adjustable thrust ring engageable with the inner race of the rear roller bearing, a drive shaft, a tapered roller bearing mounting the drive shaft in the front cover plate, a roller bearing supporting the rear end of the drive shaft in said spur gear in axial alignment with the driven shaft, and a clutch member slidable on the drive shaft embodying an internal gear portion for meshing with said spur gear and an external ring gear portion for meshing with the ring gear of the gear member.

WALTER BESONSON.